United States Patent
Naderer

(10) Patent No.: US 11,135,729 B2
(45) Date of Patent: Oct. 5, 2021

(54) METHOD AND SYSTEM FOR AUTOMATICALLY CHANGING SHAFTS

(71) Applicant: FerRobotics Compliant Robot Technology GmbH, Linz (AT)

(72) Inventor: Ronald Naderer, Oberneukirchen (AT)

(73) Assignee: Ferrobotics Compliant Robot Technology GmbH, Linz (AT)

(*) Notice: Subject to any disclaimer, the term of this patent is extended or adjusted under 35 U.S.C. 154(b) by 0 days.

(21) Appl. No.: 16/646,711

(22) PCT Filed: Sep. 13, 2018

(86) PCT No.: PCT/EP2018/074799
§ 371 (c)(1),
(2) Date: Mar. 12, 2020

(87) PCT Pub. No.: WO2019/053155
PCT Pub. Date: Mar. 21, 2019

(65) Prior Publication Data
US 2020/0376683 A1 Dec. 3, 2020

(30) Foreign Application Priority Data

Sep. 13, 2017 (DE) .......................... 102017121171.3

(51) Int. Cl.
*B25J 15/04* (2006.01)
(52) U.S. Cl.
CPC ................ *B25J 15/0458* (2013.01)
(58) Field of Classification Search
CPC .... B25J 15/04; B25J 15/0425; B25J 15/0458; B24B 45/00; B24B 45/006; B23Q 1/009; B23Q 3/157
See application file for complete search history.

(56) References Cited

U.S. PATENT DOCUMENTS 4,019,246 A * 4/1977 Tomita .................. B23B 31/263
483/8
4,091,526 A * 5/1978 Nakaso ................ B23Q 3/1554
483/7

(Continued)

FOREIGN PATENT DOCUMENTS

EP 0525699 A1 2/1993
EP 2564994 A1 * 3/2013 ............. F16J 15/061
WO 9317838 A1 9/1993

*Primary Examiner* — Bobby Rushing, Jr.
(74) *Attorney, Agent, or Firm* — Murphy, Bilak & Homiller, PLLC

(57) ABSTRACT

The invention relates to a shaft coupling. According to one embodiment, the shaft coupling comprises a first coupling part with a shaft and a conical shaft section. A tool (e.g. a grinding disc, a drill, etc.) can be fixed to a first end of the shaft, and a shaft collar is arranged on a second end of the shaft. The shaft coupling additionally comprises a second coupling part which has a conical hub into which the conical shaft section of the first coupling part can be introduced in order to form a tapered seat. The second coupling part additionally has a securing element which can be moved transversely to the rotational axis of the shaft coupling such that the securing element can engage with the shaft collar. At least one spring is arranged in the shaft coupling such that the spring generates a spring force which acts on the tapered seat in the axial direction when the securing element is engaged and biases said tapered seat.

20 Claims, 10 Drawing Sheets

(56) References Cited

U.S. PATENT DOCUMENTS

| | | | | |
|---|---|---|---|---|
| 4,399,603 A | * | 8/1983 | Reed | B23Q 3/1554 |
| | | | | 483/7 |
| 4,897,014 A | | 1/1990 | Tietze | |
| 4,922,591 A | * | 5/1990 | Campbell | B23Q 3/15546 |
| | | | | 483/1 |
| 5,002,500 A | | 3/1991 | Zuccaro et al. | |
| 5,220,749 A | * | 6/1993 | Youden | B23B 31/261 |
| | | | | 451/342 |
| 5,542,899 A | * | 8/1996 | Yamada | B23Q 3/15793 |
| | | | | 483/32 |
| 5,613,929 A | * | 3/1997 | Bayer | B23B 31/265 |
| | | | | 408/238 |
| 5,730,691 A | * | 3/1998 | Tokura | B23Q 1/0018 |
| | | | | 483/56 |
| 6,149,562 A | * | 11/2000 | Patel | B23Q 3/15533 |
| | | | | 211/1.53 |
| 6,276,864 B1 | * | 8/2001 | Russo | B23Q 1/0063 |
| | | | | 403/13 |
| 6,436,021 B2 | * | 8/2002 | Nukui | B23Q 3/155 |
| | | | | 184/6.14 |
| 10,065,327 B1 | * | 9/2018 | Chen | B25J 15/0019 |
| 2007/0077324 A1 | * | 4/2007 | Fujisaki | B30B 15/028 |
| | | | | 425/345 |
| 2014/0031184 A1 | * | 1/2014 | Lechleiter | B23B 31/1071 |
| | | | | 483/59 |

\* cited by examiner

METHOD AND SYSTEM FOR AUTOMATICALLY CHANGING SHAFTS

TECHNICAL FIELD

The present disclosure relates to a method and a system for the automatic, robot-supported changing of shafts. Grinding discs, for example, for a robot-supported grinding device or other rotating tools may be mounted on the shafts to be changed.

BACKGROUND

In robot-supported grinding devices, a grinding tool (e.g. an electrically driven grinding machine with a rotating grinding disc) is guided by a manipulator, for example, an industrial robot. The grinding tool can be coupled to the so-called TCP (Tool Center Point) of the manipulator, enabling the manipulator to adjust the position and orientation of the tool in virtually any manner desired. Industrial robots are generally position-controlled, which makes it possible to move the TCP precisely along a desired trajectory. In many applications, in order to achieve good results from robot-supported grinding the processing force (grinding force) has to be controlled, which is often difficult to realize with sufficient accuracy using conventional industrial robots. The large and heavy arm segments of an industrial robot have too much mass inertia for a controller (closed-loop controller) to be able to react quickly enough to fluctuations in the processing force. In order to solve this problem, a, (in comparison to the industrial robot, comparatively small) linear actuator can be arranged between the TCP of the manipulator and the grinding tool that couples the TCP of the manipulator to the grinding tool. The linear actuator only controls the processing force during grinding (that is, the pressing force of the tool against the workpiece), while the manipulator moves the grinding tool, together with the linear actuator, along a specified trajectory in a position-controlled manner.

Also in robot-supported grinding devices worn grinding discs are often still changed manually. Although some designs for robot-supported changing stations for the changing of grinding discs exist, the known solutions are comparatively complex, difficult to realize and therefore costly.

The inventors have set themselves the object of providing a system and a method that makes an automatic, robot-supported changing of rotating tools such as, e.g. grinding discs possible in an easy manner.

SUMMARY

The aforementioned object is achieved by means of the various embodiments described herein.

A system for the robot-supported processing of workpieces is described here. In accordance with one embodiment, the system comprises a machine tool with a motor shaft for driving a tool, a linear actuator for coupling the machine tool to a manipulator, as well as a shaft coupling for coupling the motor shaft of the machine tool to the tool. A first coupling part of the shaft coupling has a shaft with a conical shaft segment, wherein the tool can be attached to a first end of the shaft and at a second end of the shaft a shaft shoulder is arranged. A second coupling part of the shaft coupling is rigidly connected to the motor shaft of the machine tool and has a conical hub, into which the conical shaft segment (of the first coupling part) can be inserted to form a conical seat. The second coupling part further comprises a securing element that can be shifted transversely to a rotational axis of the shaft coupling, the securing element being arranged such that it can snap into place on the shaft shoulder of the shaft. The shaft coupling has at least one spring that is arranged to produce a spring load that acts on the conical seat in the direction of the axis and biases it when the securing element is snapped in place.

In the following, a shaft coupling is described. In accordance with one embodiment, the shaft coupling comprises a first coupling part with a shaft and a conical shaft segment. A tool (e.g. a grinding disc, a drill, etc.) can be attached to a first end of the shaft and a shaft shoulder is arranged on a second end of the shaft. The shaft coupling further comprises a second coupling part that has a conical hub into which the conical shaft segment of the first coupling part can be inserted to form a conical seat. The second coupling part further comprises a securing element that can be shifted transversely to the axis of rotation of the shaft coupling and that is arranged such that it can snap into place on the shaft shoulder of the shaft. At least one spring is arranged in the shaft coupling such that it produces a spring load that acts on the conical seat in axial direction and biases it.

A further embodiment refers to a method, in accordance to which, first of all, a second coupling part of a shaft coupling is arranged coaxially to a first coupling part of the shaft coupling lying ready in a changing station by means of a manipulator. After this, the second coupling part is pressed against the first coupling part until a securing element of the second coupling part snaps into place at a shaft shoulder of the first coupling part, forming a latching connection. After coupling, by lifting the second coupling part, the first coupling part can also be lifted out of the changing station. Using the tool attached to the first coupling part and with the aid of the manipulator, a (machining) process can be carried out on the workpiece. After this, the shaft coupling is placed into the changing station (or into a different changing station) in a manner so as to allow the securing element of the second coupling part to be actuated, thereby releasing the latched connection. After disengagement, the second coupling part is taken out of the respective changing station by means of the manipulator, while the first coupling part remains in the changing station.

BRIEF DESCRIPTION OF THE DRAWINGS

Various embodiments will now be described in greater detail with reference to the examples illustrated in the figures. The illustrations are not necessarily true to scale and the embodiments are not limited to the aspects presented here. Instead importance is given to illustrating the underlying principles. The figures show.

DETAILED DESCRIPTION

Figure 1:
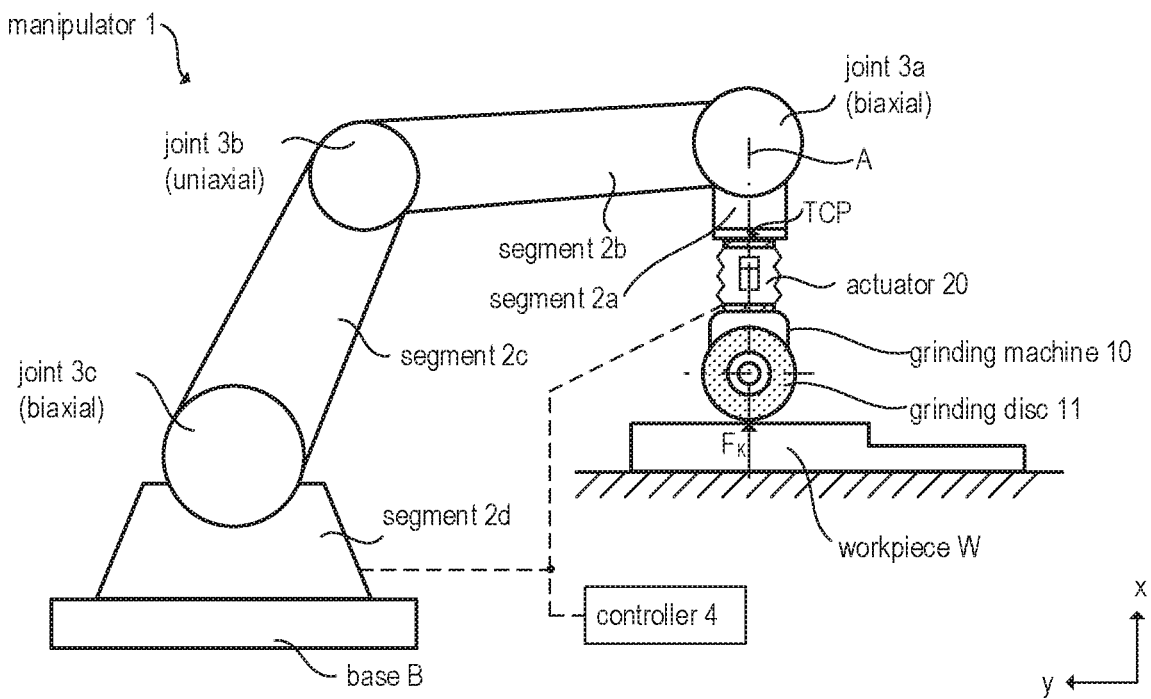
FIG. 1 schematically shows an example of a robot-supported grinding device in which the grinding machine is positioned with the aid of a manipulator.

Various embodiments are described with reference to a robot-supported grinding device. The description, however, is not limited to robot-supported grinding. The embodiments described here refer in general to a shaft coupling and to a system for changing shafts onto which any desired rotating tool can be attached, e.g. a grinding disc, a polishing disc, a drill, a milling cutter, a screwdriver, etc. The grinding machine described in this application is intended to exemplify any given machine tool and the grinding disc is intended to exemplify any given rotating tool driven by the machine tool.

Before explaining the various embodiments in detail, a general example of a robot-supported grinding device will be described. The example comprises a manipulator 1 (for example, an industrial robot) and a grinding machine 10 with a rotating grinding disc 11, wherein the grinding machine 10 is coupled to the tool center point (TCP) of the manipulator 1 via a linear actuator 20. In the case of an industrial robot that possesses six degrees of freedom, the manipulator may consist of four segments 2a, 2b, 2c and 2d, each of which is connected by the corresponding joints 3a, 3b and 3c. The last segment 2d is generally rigidly attached to a base B (which, however, need not necessarily be the case). The joint 3c connects the segments 2d and 2c. The joint 3c can be biaxial in order to enable the segment 2c to rotate around a horizontal axis of rotation (elevation angle) and around a vertical axis of rotation (Azimuth angle). The joint 3b connects the segments 2b and 2c and enables the segment 2b to carry out a swivel movement relative to the position of the segment 2c. The joint 3a connects the segments 2a and 2b. The joint 3a can be biaxial, thereby enabling (similar to joint 3c) a swivel movement in two directions. The TCP has a set position relative to segment 2a, which generally also has a rotation joint (not shown) that enables the segment 2a to perform a rotational movement around a longitudinal axis A (designated in FIG. 1 with a dot-dash line). Each axis of a joint has its corresponding actuator, which can effect a rotational movement around the respective joint axis. The actuators in the joints are controlled by a robot controller 4 in accordance with a robot program. Within certain limits, the TCP can be positioned as desired (with any chosen orientation of the axis A).

The manipulator 1 is generally position-controlled, i.e. the robot controller can determine the pose (position and orientation) of the TCP and can move it along a previously defined trajectory. Industrial robots and methods for controlling the position of the TCP are generally well known and will not be discussed here in detail. When the actuator 20 comes to rest against an end stop, the pose of the TCP also defines the pose of the grinding tool. As mentioned earlier, the actuator 20 serves to adjust the contact force (processing force) between the tool (grinding disc 11) and the workpiece W to a desired value during the grinding process. Regulating the processing force directly by means of the manipulator 1 is generally too imprecise for grinding applications, as the high mass inertia of the segments 2a-2c of the manipulator 1 renders it virtually impossible to quickly compensate for surges in the force (e.g. that occur when the grinding tool is placed onto the workpiece 40) using conventional manipulators. For this reason, the robot controller is configured to control the pose (position and orientation) of the TCP while adjusting the contact force (see, as well, FIG. 2 contact force $F_K$) can be performed exclusively by the actuator 20 that is coupled between the grinding machine 10 and the manipulator 1 (which, however, is not absolutely necessary).

As mentioned earlier, during the grinding process the contact force $F_K$ between the tool (grinding disc 11) and the workpiece W can be adjusted with the aid of the (linear) actuator 20 and that of a force control unit (which may be implemented in the controller 4, for example) such that the contact force $F_K$ between the grinding tool and the workpiece W corresponds to a specifiable desired value. This contact force is a reaction to the actuator force FA with which the linear actuator 20 presses against the surface of the workpiece. When the tool and the workpiece 40 are not in contact, the actuator 20 comes to rest against an end stop (not shown in FIG. 1 or integrated in the actuator 20) due to the lack of contact force $F_K$. The position control of the manipulator 1 (which may also be implemented in the controller 4) can operate fully independently of the force control of the actuator 20. The actuator 20 is not responsible for positioning the grinding machine 10, but only for adjusting and maintaining the desired contact force during the grinding process and for recognizing when contact between the tool (grinding machine 10 with the grinding disc 11) and the workpiece W takes place during the grinding process. Contact can be determined to have occurred, for example, when the deflection of the actuator 20 becomes smaller with respect to that at the end stop or when the change in the deflection of the actuator 20 becomes negative.

The actuator can be a pneumatic actuator and may have, for example, a double-acting pneumatic cylinder. Other pneumatic actuators, however, may also be used such as, for example, bellows cylinders or air muscles. As an alternative, direct (gearless) electric drives may also be considered. When a pneumatic actuator is used, the force regulation can be realized in a commonly known manner with the aid of a control valve, a regulator (implemented in the controller 4) and a compressed air reservoir. The implementation specifics, however, are of no importance for the remaining description and will not be discussed in detail. In some applications, the actuator 20 is not needed and may be omitted. In such a case the robot/manipulator 1 can control the processing force directly. There are also applications that do not require that the force be regulated and in these cases the robot/manipulator 1 operates only position-controlled. Whereas the force and position control is of no further relevance for the shaft coupling and the shaft changing system described here, it may, however, be useful for the (machining) process that is carried out with the tool. In the example illustrated in FIG. 2, a bracket 21 is arranged between the actuator 20 and the outmost segment 2a of the manipulator (see, as well, FIG. 1) and is roughly L-shaped.

Figure 2:
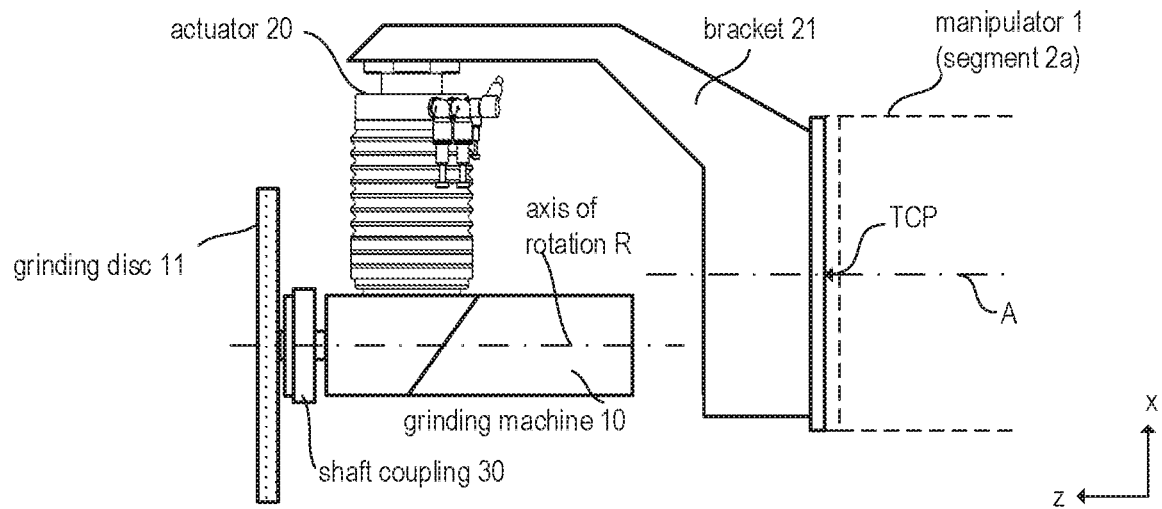
FIG. 2 schematically shows the grinding machine, a bracket for mounting the grinding machine onto the manipulator and a shaft coupling that couples the grinding disc to the shaft of the grinding machine.

The bracket 21 serves the purpose of allowing the linear actuator 20 to be mounted onto the manipulator 1 not coaxially to the axis A of the segment 2a (as shown in FIG. 1), but rather tilted at an angle of, e.g. 90° so that the axis of rotation R of the grinding machine lies essentially parallel to the axis A. Depending on the application and the specific implementation of the robot cell, the bracket can also be omitted (in this case the actuator 20 can be directly mounted on the manipulator 1) or a bracket with an angle other than 90° can be used. In FIGS. 1 and 2 the position of the local coordination system of the grinding machine is also shown. In this coordination system the axis of rotation R of the grinding machine is also the axis labeled z and the linear actuator 20 operates along the axis labeled x.

The tool (e.g. the grinding disc 11) can be connected to the drive (e.g. the motor of the grinding machine 10) via a shaft coupling 30. In this case the tool is connected to a first coupling part of the shaft coupling 30 and the drive shaft of the motor is connected to a second coupling part of the shaft coupling 30. The first coupling part can be regarded as a special kind of shaft stub on which the tool (the grinding disc 11) is mounted. With the aid of a particular changing station (see, e.g. FIG. 10), a robot can automatically change the tool, whereas the assembly, consisting of the tool and the first coupling part, is always changed in its entirety.

Figure 3:
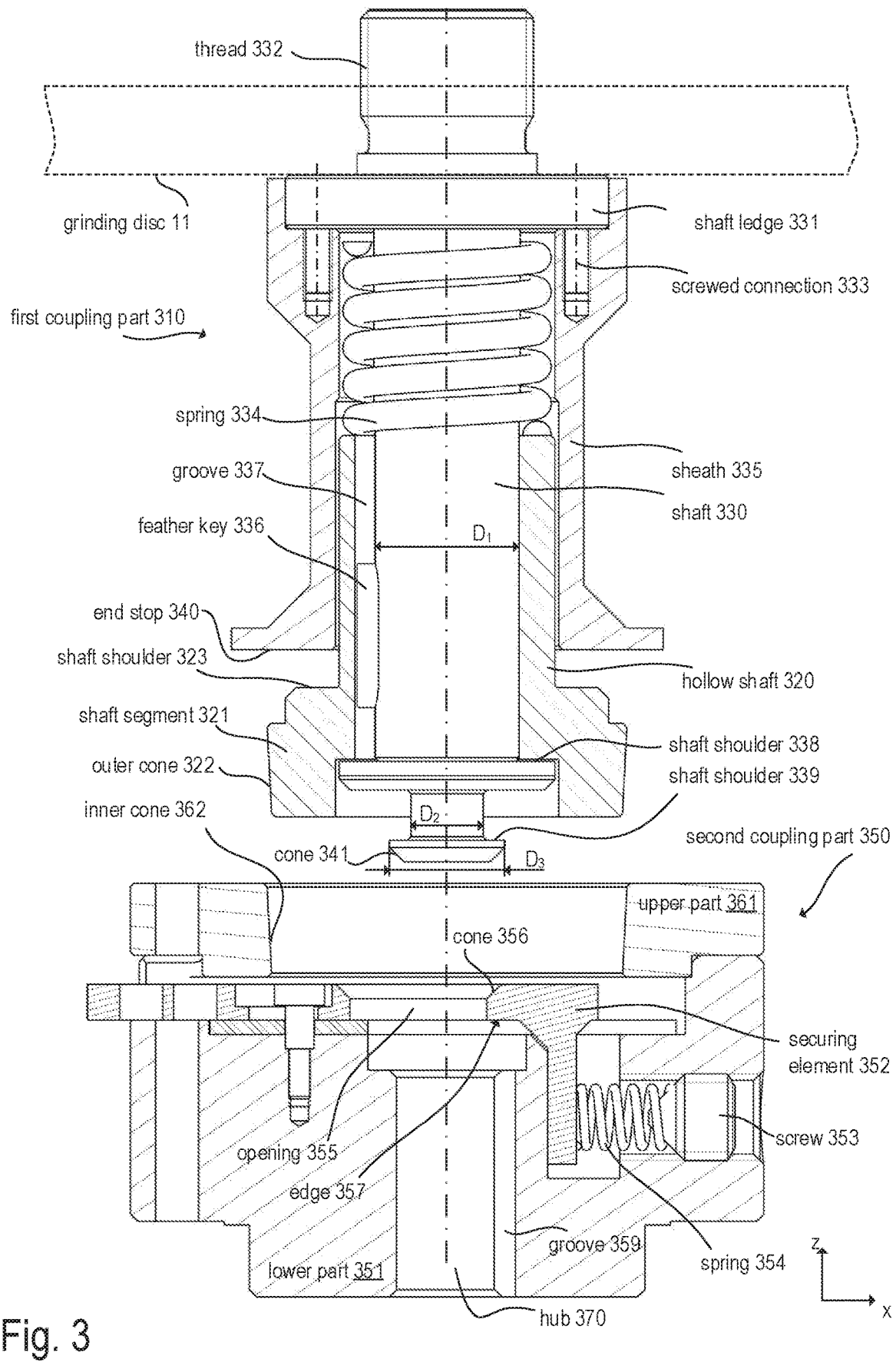
FIG. 3 shows an exemplary implementation of a shaft coupling from the example of FIG. 2. in a disengaged state.

FIG. 3 shows an exemplary implementation of a shaft coupling 30 (in a disengaged state) that can be used for an automatic, robot-supported changing of grinding discs. The shaft coupling has a first coupling part 310 and a second coupling part 350. The first coupling part 310 is connected to a grinding disc 11 when in operation, by means of a screwed connection, for example. In the present example, a grinding disc 11 is placed onto one end of a shaft 330 and is then secured by means of a nut (not shown) that is screwed onto a thread 332 provided on the end of the shaft, thus clamping the grinding disc 11 in place between the nut and a shaft ledge 331 of the shaft 330. The second coupling part 350 has a hub 370, into which the drive shaft of the grinding machine 10 (not shown in FIG. 3) can be inserted and it can be secured in a conventional manner by means of a feather key arranged in the groove 359. The two coupling parts 310 and 350 can be connected by means of a conical seat (with the outer cone 322 on the first coupling part 310 and the inner cone 362 on the second coupling part 350). The manner in which the two coupling parts 310 and 350 engage and how they can be secured to each other will be described in detail below with reference to FIGS. 4-7. First, the construction design of the first coupling part 310 will be described in greater detail.

The first coupling part can be regarded as a kind of telescope shaft that is constructed, inter alia, from the shaft 330 (on which the grinding disc 11 is secured) and a hollow shaft 320, wherein the shaft 330 and the hollow shaft 320 can be shifted axially towards each other (along the axis of rotation R). The hollow shaft 320 can be shifted relative to the shaft 330 between two end positions. A sheath 335 is arranged coaxially to the shaft 330, wherein the sheath 335 and the shaft 330 are rigidly attached to each other, for example, by means of a screwed connection 333 that connects a shaft segment 331 of the shaft 330 to the sheath 335. The outer and inner diameters of the hollow shaft 320 are dimensioned to allow the hollow shaft 320 to slide (in axial direction) between the shaft 330 and the sheath 335. The inner diameter of the sheath 335 and the outer diameter of the hollow shaft 320 can form a clearance fit. In the same manner, the inner diameter of the hollow shaft 320 and the outer diameter $D_1$ of the shaft 330 can also form a clearance fit. A feather key 336 arranged in a groove 337 of the shaft 330 prevents rotation between the hollow shaft 320 and the shaft 330.

As mentioned earlier, the hollow shaft 320 can be shifted relative to the shaft 330, wherein a first end position of the hollow shaft 320 is formed by a shaft shoulder 338 of the shaft 330 and a second end position of the hollow shaft 320 is formed by an end face of the sheath 335 that serves as the end stop 340. In the second end position the hollow shaft 320 is inserted as far as possible into the sheath 335 and a shaft shoulder 323 of the hollow shaft 320 rests against the end stop 340. In the first end position the hollow shaft 320 protrudes at its maximum distance out of the sheath 335 and a shaft ledge on the inside of the hollow shaft rests against a shaft shoulder 338 of the shaft 330. A spring 334 is arranged in the sheath 335 such that the elastic force pushes the hollow shaft 320 out of the sheath 335 and presses it against the shaft shoulder 338 in axial direction.

One shaft segment has, at the lower end of the shaft 330, a diameter $D_2$, which may be somewhat smaller than the diameter $D_1$. A cone 341 is provided at the lower end face of the shaft 330 which has a maximum diameter $D_3$ that is smaller than the diameter $D_2$, such that a shaft shoulder 339 is formed on the backside of the cone 341. This shaft shoulder 339 serves to axially secure the first coupling part 310 to the second coupling part 350 (cf., e.g. FIG. 7). The cone 341 is created, e.g. by beveling the peripheral edge at one end of the shaft 330. The bevel forms the mentioned cone 341.

The second coupling part 350 may have a two-piece housing (a upper part 361 and a lower part 351) which, for example, may be rigidly attached to each other (e.g. by means of screws). The upper part 361 of the housing has a central inner cone 362 (i.e. a conical hub) which, together with the corresponding outer cone 322 (on the hollow shaft 320) of the first coupling part 310, can form a conical seat (see, e.g. FIG. 7). The inner cone 362 extends through the entire upper part 361 and is rotationally symmetrical in relation to the axis of rotation R. A radially (transversely to the axis of rotation R and relative to the housing of the second coupling part 350) shiftable securing element 352 is arranged on the lower part 351 of the housing and is pressed against an end stop in the lower part by a spring 354. In the example shown here the spring 354 is arranged in a radial borehole in the lower part 351 of the housing and is closed with a screw 353. The elastic force of the spring 354 thus takes effect between the securing element 352 and the screw 353.

The lower part 351 of the housing has a central hole that forms a hub 370 for a motor shaft of the grinding machine 10 (cf. FIG. 2). The hub 370 may be in the form of a groove 359 to accommodate a feather key (not shown). As an alternative to the feather key, any other desired shaft-hub connection can also be used to attach the second coupling part 350 to the motor shaft of the grinding machine 10.

The securing element 352 has a central opening 355 below the conical hub (inner cone 362), through which the axis of rotation R extends. The upper edge of the opening 355 is beveled, by which the bevel forms a small inner cone 356. When in an engaged state, the lower edge 357 of the opening 355 rests against the shaft shoulder 339 of the shaft 330 of the first coupling part 310, securing the two coupling parts 310, 350 to each other (cf., e.g. FIG. 7). In the illustration of FIG. 3, the central opening 355 in the securing element 352 is shown slightly off-center of the axis of rotation R.

Figure 4:
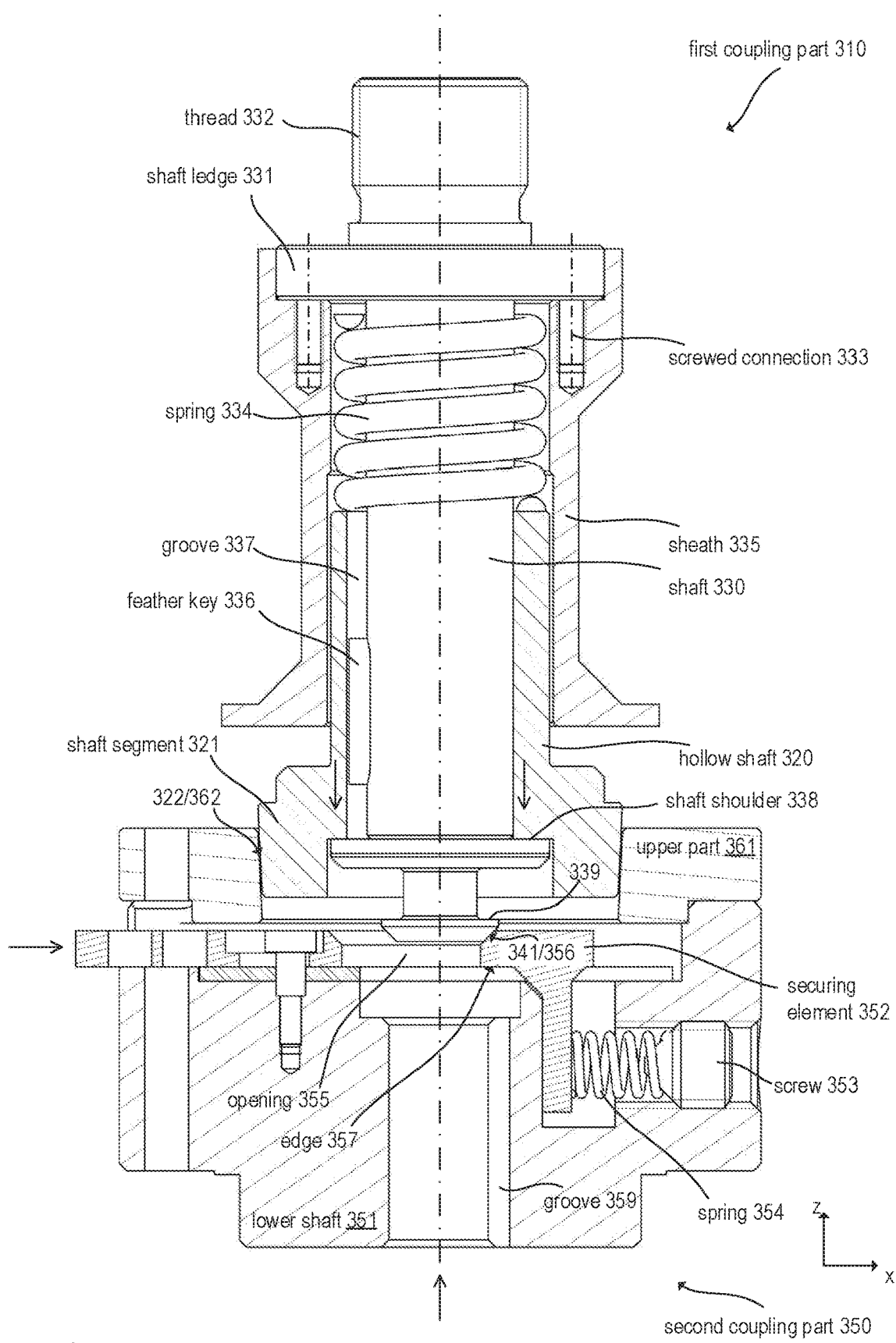
FIGS. 4-7 show the shaft coupling in accordance with FIG. 3 in differing positions while it is in the process of being engaged.
Figure 5:
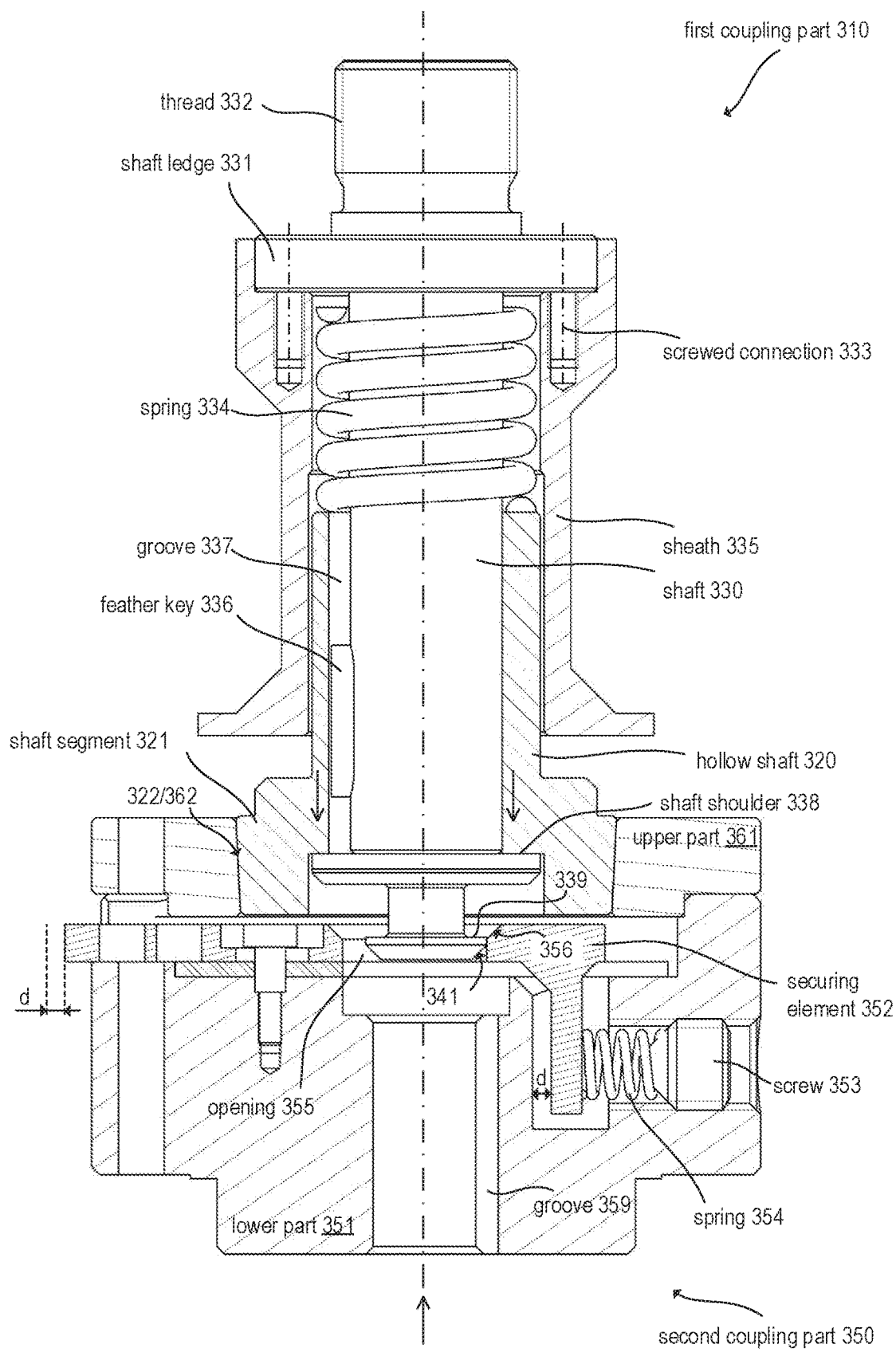
Figure 6:
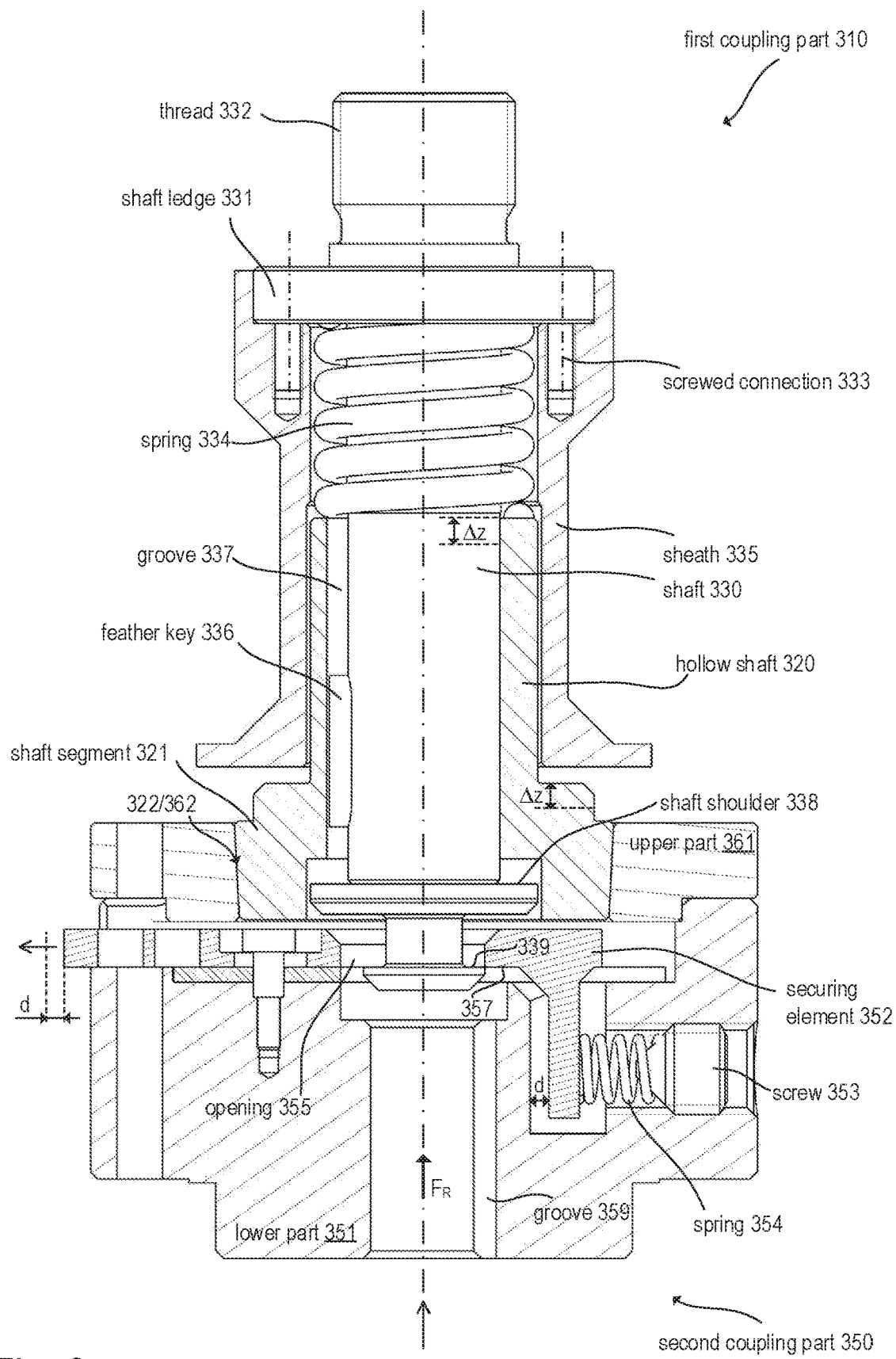

In the FIGS. 4-6, the two coupling parts 310 and 350 of the shaft coupling from FIG. 3 are illustrated in numerous (intermediate) positions during the engagement process. In one example, the first coupling part 310, together with a grinding disc 11 attached to it, lies ready to be engaged on a base plate (cf., e.g. FIG. 10), and the second coupling part 350 is pressed down onto the first coupling part 310 from above by the robot (in this case the position of the shaft coupling is completely reversed (upside down), as shown in FIG. 3). Alternatively, the first coupling part 310, together with an attached grinding disc 11, can be arranged hanging from a base plate and the second coupling part 350 is pressed up onto the first coupling part 310 from below (in the case the position of the shaft coupling is the same as shown in FIG. 3). Engagement and disengagement can also be carried out when the shaft coupling is in an inclined position.

FIG. 4 illustrates a state in which the second coupling part 350 has already been partially placed onto the first coupling part 310 along the axis of rotation R (in the direction z). At this point the conical shaft segment 321 (outer cone 322) of the hollow shaft 320 of the first coupling part 310 is inserted into the conical opening (inner cone 362) of the upper part 361 of the housing of the second coupling part 350. Upon reaching a certain insertion depth, the beveled end (cone 341) of the shaft 330 of the first coupling part 310 contacts the (e.g. sloped, beveled) edge (inner cone 356) of the central opening 355 of the securing element 352. The bevels 341, 456 can slide on each other while the securing element 352 is being shifted transversely to the axis of rotation.

FIG. 5 illustrates a state in which the second coupling part 350 has been completely placed on the first coupling part 310 along the axis of rotation R (in direction z). In the process, the conical shaft segment 321 (outer cone 322) of the hollow shaft 320 of the first coupling part 310 and the conical hub (inner cone 362) of the upper part 361 of the housing of the second coupling part 350 form a conical seat (designated in FIG. 5 as 322/362). When the first coupling part 310 is completely inserted into the second coupling part 350, the securing element 352 is pushed to the side by the sloped end (cone 341) of the shaft 330. In the situation illustrated in FIG. 5, the securing element 352 has been moved by the distance of one shift d to the right (in the direction of the axis x), as compared to the situation illustrated in FIG. 4. This shifting of the securing element 352 is augmented by the fact that the outer cone 341 (or the bevel) at the end of the shaft 330 matches the inner cone 356 at the edge of the opening 355 in the securing element 352, which allows the conical surfaces to slide on each other more easily. Here it should be pointed out, however, that an oblique or convex shape may also be used instead of the conical shape. It is also sufficient if only one of the two parts (shaft 330, securing element 352) at the point of contact is conical, oblique or convex.

Figure 7:
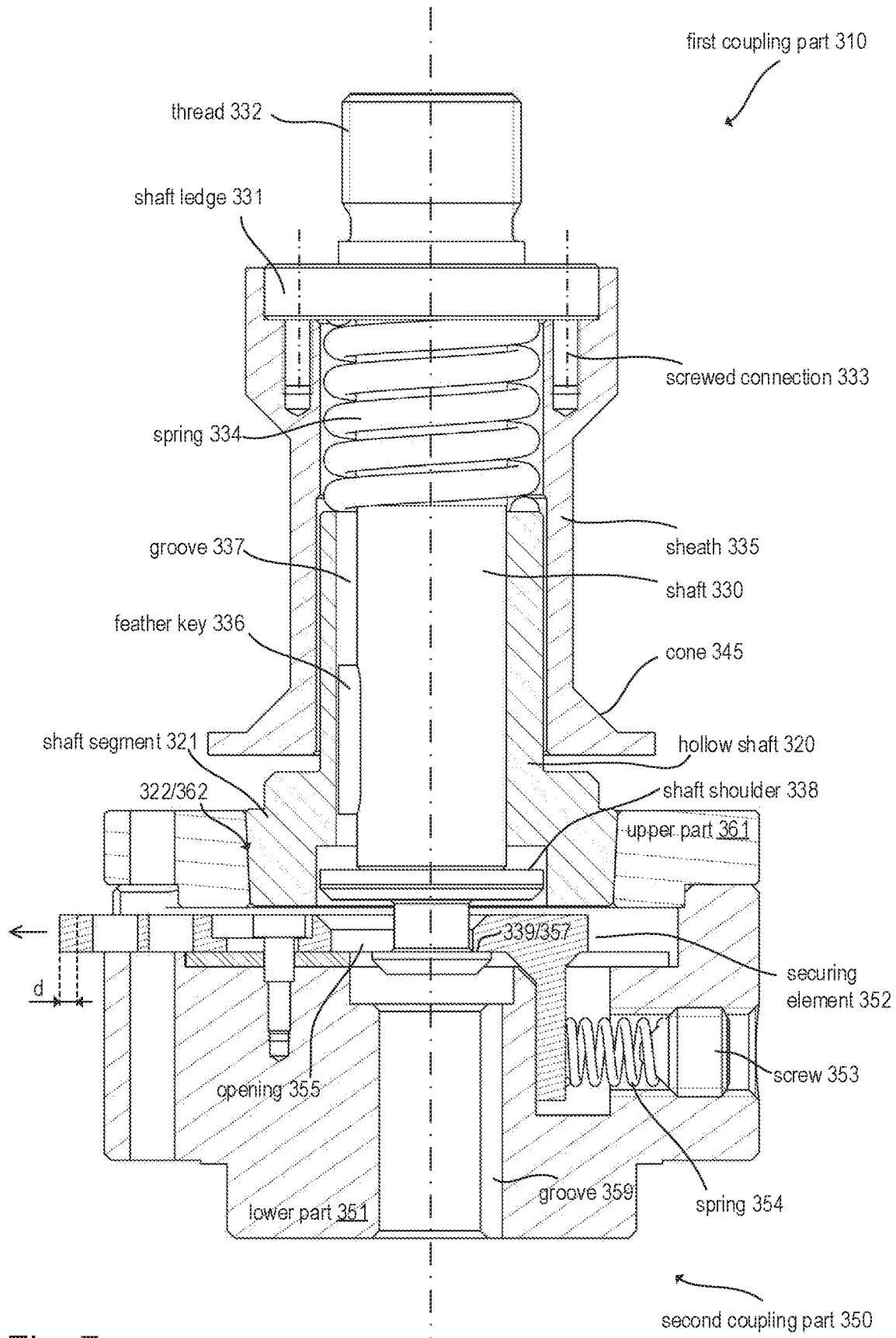

In the situation illustrated in FIG. 5, the spring 334 is still pressing the shaft shoulder 338 of the shaft 330 against a ledge of the hollow shaft 320. In order that the shaft 330 be inserted into the second coupling part far enough for the securing element on the shaft shoulder 339 of the shaft 330 to snap into place, the spring 334 has to be compressed. In comparison to the situation illustrated in FIG. 5, the spring 334 from FIG. 6 has been compressed by the equivalent of one shifting distance $\Delta z$, by means of which the shaft 330 is further inserted into the second coupling part 350 by a distance of $\Delta z$ and the lower edge 357 of the securing element 352 snaps into place on the shaft shoulder 339 of the shaft 330 when the securing element 352 is pushed back into its original position by the spring 354. FIG. 6 shows the situation immediately preceding the snap-in of the securing element 352 and FIG. 7 shows the situation immediately after the securing element 352 has snapped into place. The force $F_R$ needed to compress the spring is provided by the manipulator (see FIG. 1), wherein the force $F_R$ is equal to $k_F \cdot \Delta z$, in which $k_F$ represents the spring constant of the spring 334.

Once the securing element 352 has snapped into place on the shaft shoulder 339 of the shaft 330, the two coupling parts 310, 350 are connected, via the conical seat 322/362 in a friction-locked manner. The conical seat is biased in axial direction (direction z) by the elastic force $k_F \cdot \Delta z$. In order to release the connection of the two coupling parts 310, 350 (with the aid of the manipulator, see FIG. 1), it is only necessary to move the securing element 352 against the force of the spring 354 until the securing element 352 on the shaft shoulder 339 of the shaft 330 is released, allowing the spring 334 to push the shaft 330 back into its starting position (in which the shaft shoulder 338 rests against a ledge of the hollow shaft 320).

Figure 8:
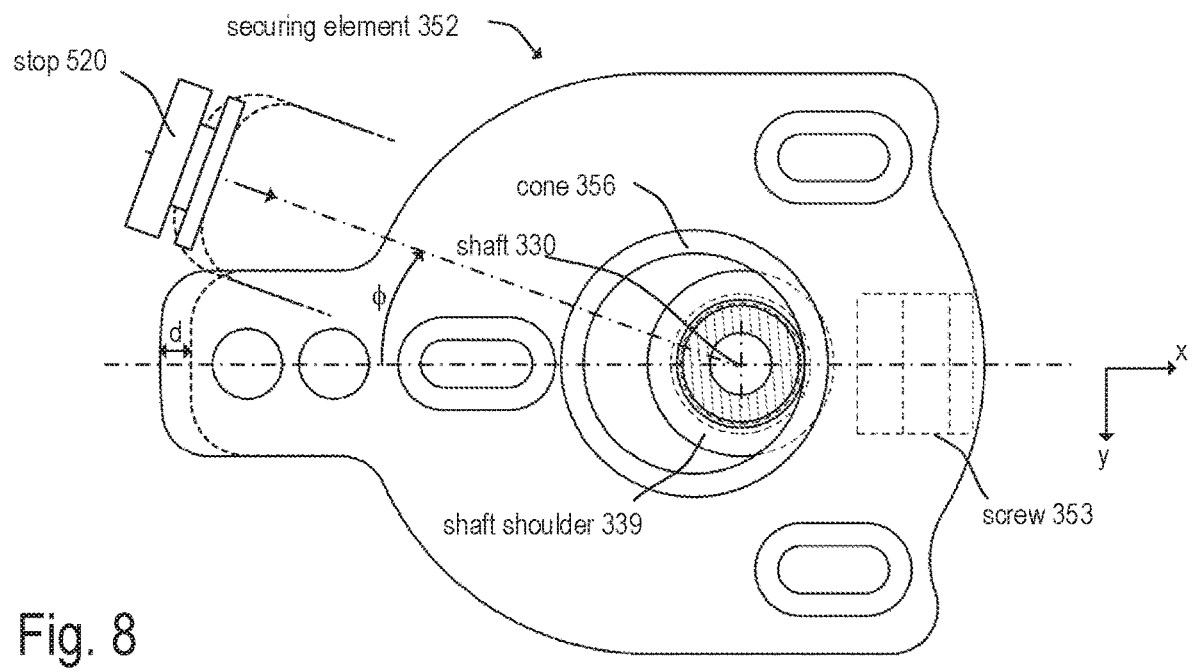
FIG. 8 shows a securing element of the shaft coupling from FIG. 3 as seen from above.

FIG. 8 is a detailed view of the securing element 352 when snapped in place on the shaft shoulder 339 of the shaft 330. Here the edge 357 of the opening 355 of the securing element 352 rests against the shaft shoulder 339 and thereby prevents the shaft 330 from snapping back due to the elastic force of the spring 334 (cf. FIG. 7). The slots provided in the securing element 352 only serve to guide the securing element transversely to the axis of rotation R (transversely to the direction z).

In order to once again release the connection of the two coupling parts 310 and 350, the manipulator can move the grinding tool to a defined stowed position. Nearby and in a defined position in relation to the stowed position, a stop 520 is provided. For example, by rotating the shaft coupling around the axis of rotation R of the shaft 330, the robot can position the shaft coupling such that the stop 520 pushes the securing element 352 against the force of the spring 354 (see FIG. 7, not shown in FIG. 8) and into the second coupling part 350, releasing the latching connection between the securing element 352 and the shaft shoulder 339 of the shaft 330. In order to compensate for small tolerances, the stop 520 can also be spring-mounted, wherein the spring stiffness of the stop is greater than the spring stiffness of the spring 354. As soon as the latching connection is released, the shaft 330 snaps back into the first coupling part 310 and the conical seat connection is released. The impulse generated by the shaft 330 snapping back generally suffices to disconnect the conical seat. The robot can then lift up the second coupling part 350 without the tool that is attached to the first coupling part 310.

Figure 9:
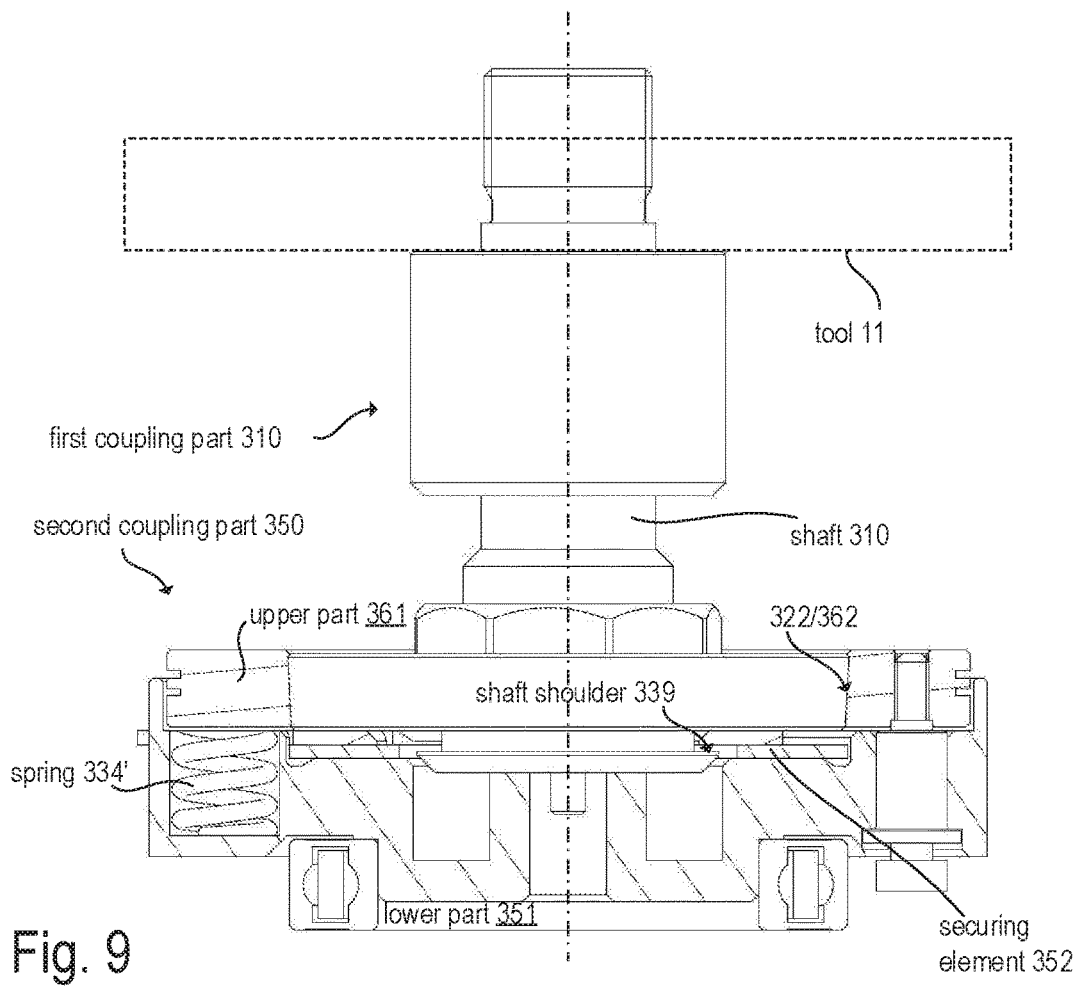
FIG. 9 shows a further exemplary implementation of the shafts from the example of FIG. 2 in an engaged state.

FIG. 9 shows an alternative embodiment of the shaft coupling in which the spring 334 that provides the elastic force for biasing the conical seat is not arranged, as in the example of from FIG. 7, in the first coupling part 310, but instead in the second coupling part 350. The functioning is essentially the same as in the previous example in accordance with FIGS. 3-7, although in this case the first coupling part 310 can have a simpler design (as the spring is omitted). For example, the first coupling part 310 can also be a fixed component. The spring 334, as opposed to the previous case, is arranged between the upper part 361 and the lower part 351 of the housing of the second coupling part 350. When the first coupling part 310 is inserted into the second coupling part 350, the lower part 351 is pushed, counter to the elastic force of one or more springs 334', towards the upper part 361 until the securing element snaps into place at a shaft shoulder of the shaft 330 of the first coupling part, thereby connecting the two coupling parts 310 and 350 to each other and biasing the conical seat with the elastic force. The disengagement of the shaft coupling functions analogously to that of the previous example (see, e.g. FIG. 8).

Figure 10:
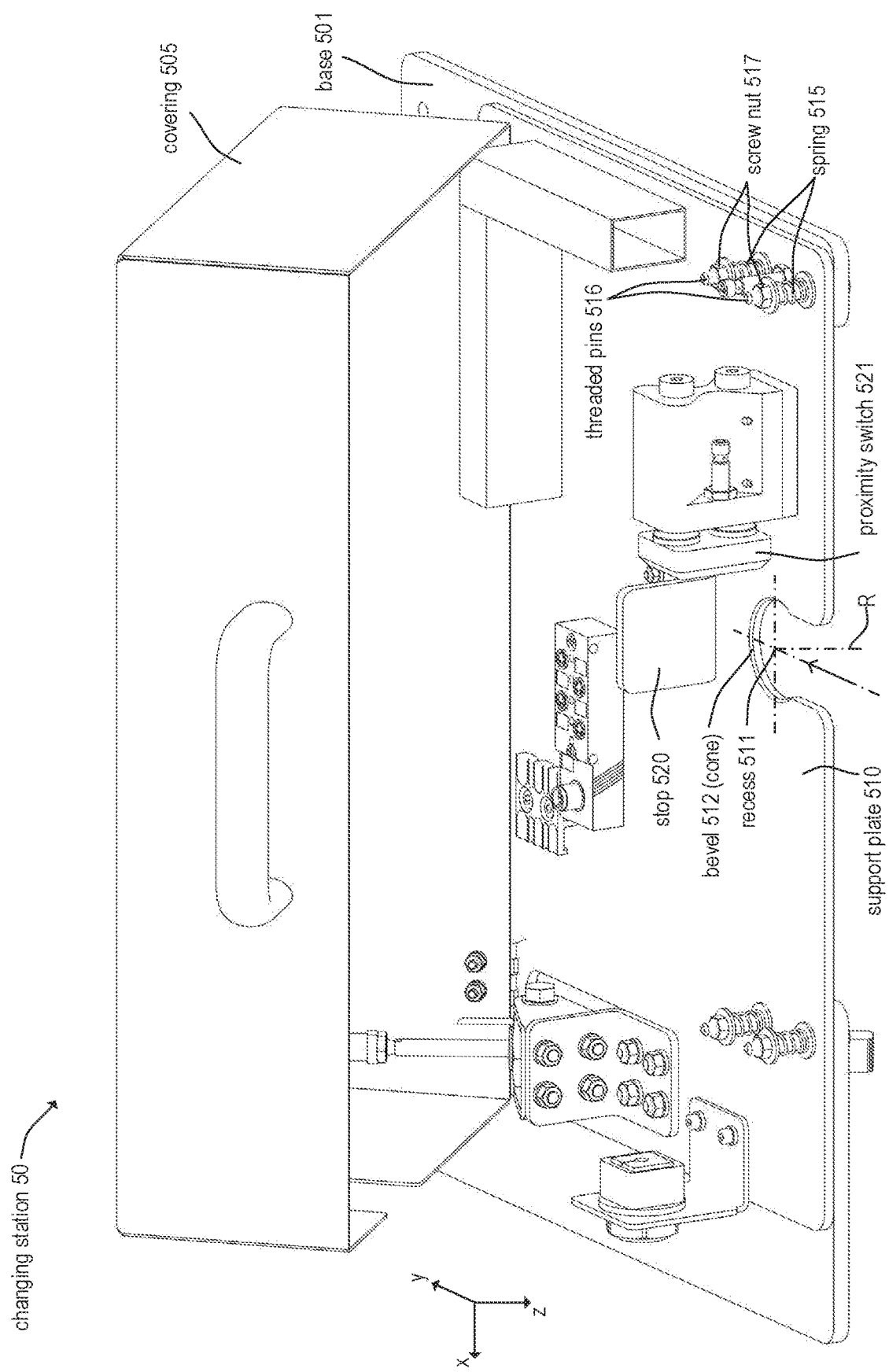
FIG. 10 shows an example of a changing station with which a robot can change a tool that is connected to the machine via one of the shaft couplings described here.
Figure 11:
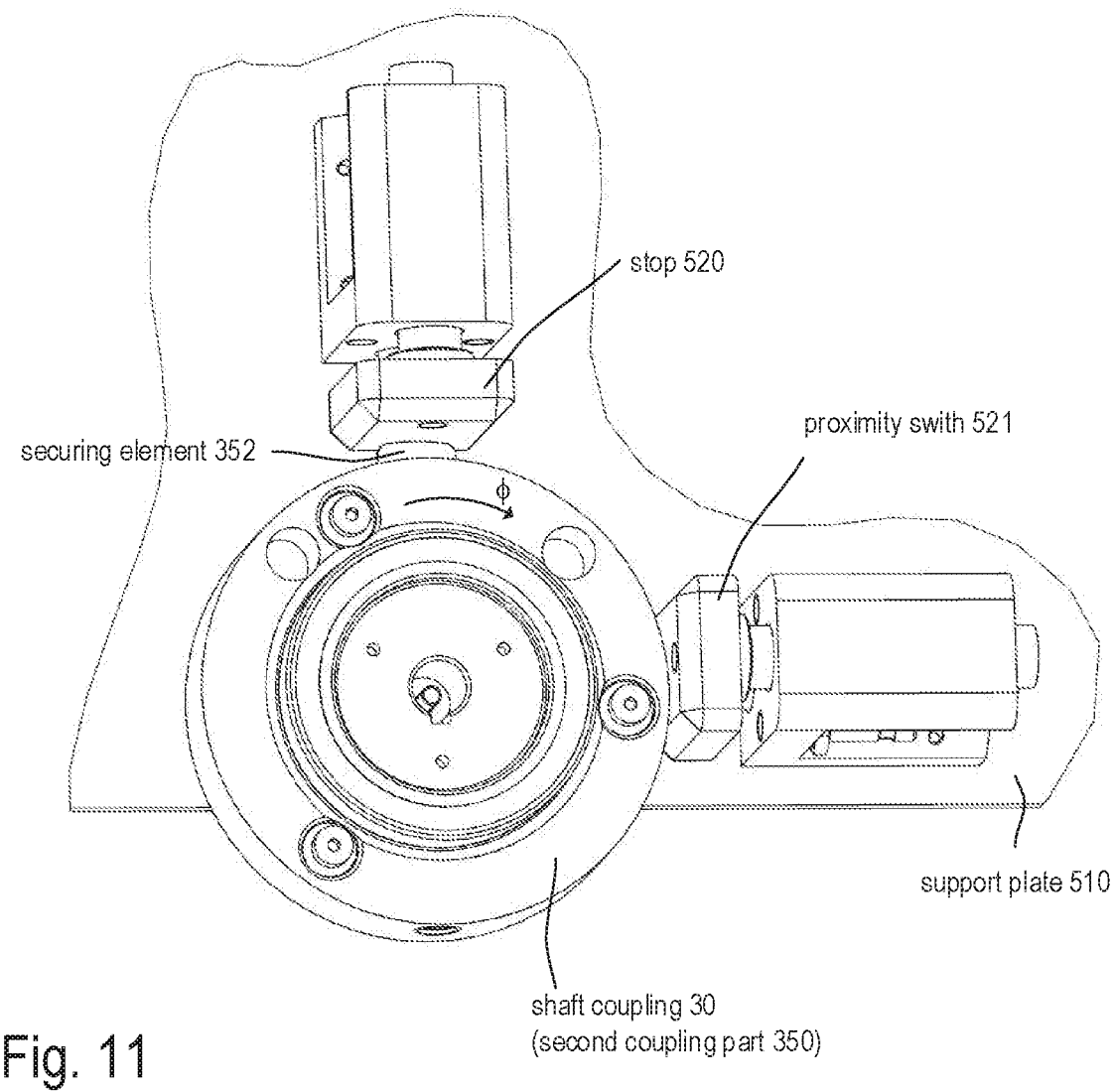
FIG. 11 shows a detail of the changing station from FIG. 10 together with the shaft coupling.

FIG. 10 illustrates an exemplary changing station 50 that is suitable for an automatic, robot-supported changing of tools (e.g. grinding discs 11 including the first coupling part 310). FIG. 11 shows a detail of the changing station 50 with an inserted shaft coupling 30. Numerous similar changing stations can be arranged (e.g. next to each other) in the operating area of a robot/manipulator (e.g. in a robot cell).

In this manner, different tools can be made available for the various (machining) processes that are carried out by the robot/manipulator; by simply changing the shaft (together with the tool attached to it), numerous (different) operations can be performed at one work station with the aid of a robot/manipulator.

The changing station comprises a base 501 that is generally stationary and has a defined position that is known to the robot controller. A support plate 510 is mounted on the base 501. In the example shown here the support plate 510 is movably (in the direction z) mounted on the base 501 using threaded pins 516 that are screwed to the base 501 and extend through corresponding holes in the support plate 510. The support plate 510 is pressed against the base 501 by springs 515 that act between the support plate 510 and on nuts screwed on the threaded pins 516. As a result, the support plate 510 can be lifted up from the base against the force of the springs 515. The purpose of this mounting form will be explained further below. In alternative embodiments the support plate 510 is rigidly connected to the base 501 or the base 501 also serves as the support plate 510. The covering 505 is also optional.

A recess 511 is provided in the support plate 510 into which the robot (see FIG. 1, manipulator 10) can insert the shaft coupling 30 sidewise. In the example shown here, the shaft coupling is inserted into the recess 511 in the direction y (see arrow in FIG. 10). The recess 511 may have a round contour at its back end. Further, the upper edge of the recess 511 may be beveled. The bevel 512 will then form a cone on which the first coupling part 310 of the shaft coupling 30 can lie. More specifically, the cone 345 of the hollow shaft 320 of the first coupling part 310 (see, e.g. FIG. 7) comes to rest on the bevel 512 when the connection of the two coupling parts 310, 350 is released. The position of the axis of rotation R of the motor shaft of the grinding machine 10 (cf. FIG. 2) is also shown in FIG. 10 (in a situation in which the shaft coupling 30 is inserted in the recess 511).

At least one stop 520 and a proximity switch 521 (e.g. a contact switch) are arranged on the support plate 510. The function of the stop and of the proximity switch 521 is made apparent in FIG. 11. In FIG. 11 a situation is illustrated in which the shaft coupling 30 has just been rotated such that the outer end of the securing element 352 comes to rest against the stop 520. The rotation of the shaft coupling 30 up to the stop was explained with reference to FIG. 8. In the position shown in FIG. 10 the angle of rotation defined, for example, as $(1)=0°$ (without loss of generality). In this position the stop 520 pushes the securing element 352 into the second coupling part 350 and releases the latching connection to the shaft 330. After the shaft connection has been released the tool 11 remains in the changing station together with the first coupling part 310 and may later be replaced, (e.g. manually) with a new tool 11.

In order to couple a new tool, the robot moves the grinding machine 10 to a changing station 50 that is loaded with a new grinding disc 11 (including the first coupling part 310) so that the axis of rotation R of the motor of the grinding disc 11 extends coaxially to the axis of rotation of the tool intended for coupling (cf. FIG. 3). The coupling process has already been explained in detail with reference to FIGS. 3-7. In order to monitor the process, the manipulator rotates the shaft coupling until the outer end of the securing element 352 points in the direction of the proximity switch 521 ($\phi=90°$), thus ensuring that the latter detects the securing element 352. This rotation can be carried out by the manipulator itself or it can be performed by controlling the motor of the grinding machine.

During the coupling process the securing element 352 moves away from the proximity switch by a distance d (cf. FIGS. 4-5) and then moves back into its starting position (cf. FIGS. 6-7). This movement (forwards, back and again forwards) of the securing element 352 can be detected by the proximity switch 521 and in this way it can be assured that the coupling of the two coupling parts 310, 350 is correctly carried out. Proximity switches 521 generally detect the presence of the securing element 352 by means of a mechanical contact. However, contactless (e.g. inductive, capacitive or optical) proximity switches can also be used, all of which are generally also referred to as proximity sensors.

The spring-mounting of the support plate 510 on the base 501 is also a safety feature. If (for whatever reason) the disengagement of the shaft coupling 30 fails, the robot, when attempting to lift up the grinding machine 10 together with the second coupling part 350, will also lift the support plate 510 counter to the elastic force of the springs 515, as the still engaged first coupling part 310 will take the support plate with if the coupling is still inserted in the recess 511. This lifting of the support plate 510 can be detected by means of a sensor. Sensors suitable for this purpose include, e.g. contact sensors, proximity sensors, light sensors (which is covered by the support plate when it is not lifted), etc.

Figure 12:
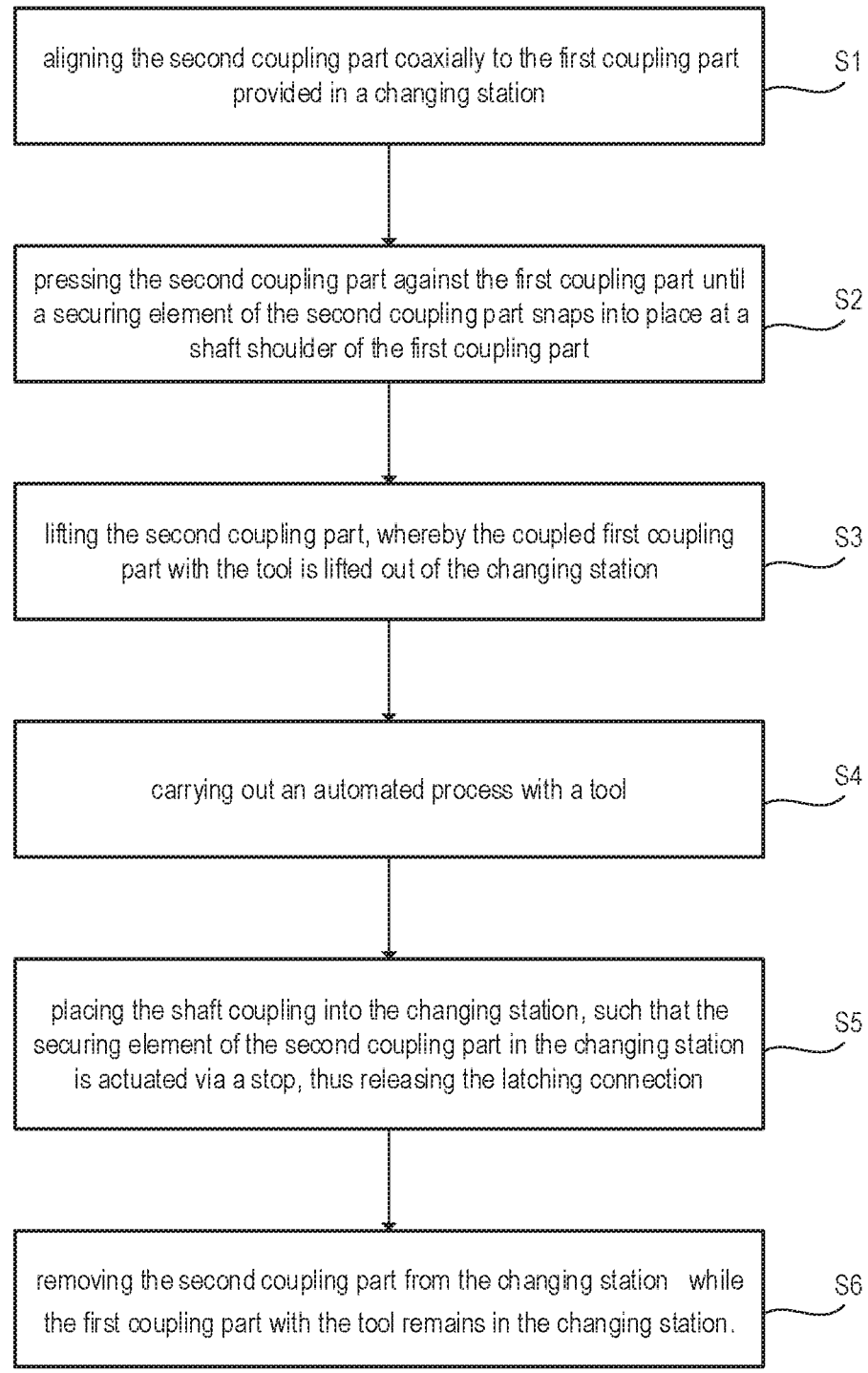
FIG. 12 is a flow chart depicting the progression of a shaft changing process.

FIG. 12 is a flow chart showing the progression of a shaft-changing process, that is, the engaging of a shaft coupling such as that shown, for example, in FIGS. 3-7, as well as the disengaging of the shaft coupling such as that shown, for example, in FIG. 11. For the initial situation it is assumed that a changing station has already been loaded with a shaft (of the first coupling part 310, see FIG. 3 and cf. FIG. 10, in which the first coupling part 310 rests in the recess 511 of the changing station 50). With the aid of a manipulator 1 (cf. FIG. 1) a machine tool is moved, together with the second coupling part, to the changing station, aligning the two coupling parts principally coaxially to each other (see FIG. 12, step S1). After this the manipulator can press the two coupling parts together until a securing element snaps into place at a shaft shoulder of the first coupling part (see FIG. 12, step S2, cf. also FIGS. 6-7, securing element 352 snaps into place on the shaft shoulder 339). Following this, the manipulator can lift up the second coupling part (and thus the entire shaft coupling together with the tool) and remove it from the changing station (FIG. 12, step S3). In the example illustrated in FIG. 10 the second coupling part is moved out of the recess 511. Afterwards the coupled tool may be used for the automated machining of a workpiece (see FIG. 12, step S4). At the end of the machining process (or of a part thereof) the shaft coupling can one again be placed into a changing station (into the same one or into a different one), wherein, upon insertion over a stop in the changing station (cf. FIG. 10, stop 520), the securing element is actuated, thereby releasing the latching connection (cf. state previous to release in FIG. 7, state after release in FIG. 6, see also FIG. 12, step S5). Finally the manipulator can move the disengaged second coupling part out of the changing station and the first coupling part remains, together with the (used) tool, in the changing station (FIG. 12, step S6).

The embodiments of the shaft coupling and the changing station described here do not require their own energy supply (e.g. electricity or compressed air). Consequently the shaft coupling has no need of supply lines for electricity, compressed air, etc. and plug connectors, sliding contacts and the similar can be omitted. Neither does the changing station (see FIG. 10) require a drive of its own.

In the following, a few aspects of the embodiments described here will be summarized. This is not to be understood as a complete listing of the relevant technical features, but only as exemplary one. One embodiment refers to a shaft coupling that has a first coupling part with a shaft and a conical shaft segment (cf., e.g. FIG. 3). A tool (e.g. a grinding disc, a drill, etc.) can be attached to a first end of the shaft and a shaft shoulder is provided on a second end of the shaft. The shaft coupling has a second coupling part that has a conical hub into which the conical shaft segment of the first coupling part can be inserted to form a conical seat. The second coupling part also has a securing element that can be shifted transversely to an axis of rotation of the shaft coupling and that is arranged such that it can snap into place on the shaft shoulder of the shaft (cf. FIGS. 6 and 7). At least one spring is arranged in the shaft coupling such that it produces an elastic force that acts on the conical seat in axial direction and biases it when the securing element is snapped in place.

The spring that biases the conical seat may be arranged either in the first coupling part (see FIG. 3, spring 334) or in the second coupling part (see FIG. 9, spring 334'). In accordance with one embodiment (see, e.g. FIG. 3), the first coupling part has a hollow shaft that is mounted on the shaft to be axially moveable. The conical shaft segment is, in this case, part of the hollow shaft (see FIG. 3, shaft segment 321 on the outside of the hollow shaft 320). The spring is in the first coupling part and is arranged such that, when the conical shaft segment is inserted into the conical hub, the hollow shaft is pushed counter to the elastic force of the springs on the shaft (see FIGS. 4 to 6). The relative movement between the hollow shaft and the shaft causes the shaft shoulder of the shaft to be inserted into the second coupling part until the securing element can snap into place on the shaft shoulder and form a latching connection.

The shaft may have a further shaft shoulder that forms an end stop for the hollow shaft, wherein the elastic force of the spring presses the hollow shaft against the end stop. A feather key can be arranged between the shaft and the hollow shaft so as to allow for an axial movement (relative movement) between the shaft and the hollow shaft while, however, blocking a rotation between the shaft and the hollow shaft.

As previously mentioned, the spring that biases the conical seat may also be arranged in the second coupling part (see FIG. 9, spring 334'). In this case the second coupling part has a lower part and a upper part that can be axially shifted relative to the lower part. The conical hub is provided in the upper part and the at least one spring is arranged between the lower part and the upper part such that, when the conical shaft segment is inserted into the conical hub counter to the elastic force of the spring(s), the lower part is moved towards the upper part (see, e.g. FIG. 9, spring 334' acts between lower part 351 and upper part 361 and biases the conical seat).

An outer end of the securing element may protrude from the second coupling part. Further, the securing element can have a (central) opening into which the shaft can be inserted until the securing element can snap into place on the shaft shoulder of the shaft, whereby the latching connection prevents the shaft from being pulled back out of the opening. While snapping into place, an edge, for example, of the central opening in the securing element is pushed behind the shaft shoulder of the shaft (transversely to the axis of rotation of the shaft coupling, cf. FIGS. 6 and 7). When the securing element is snapped in place, the elastic force of the spring biases the conical shaft segment against the conical hub. The edge of the opening in the securing element and a peripheral edge of the shaft may also each be beveled. The bevel on the edge of the shaft and the bevel on the edge of the opening can slide on each other while the shaft is being inserted into the opening and the securing element is being moved.

A further embodiment refers to a system with a manipulator and a machine tool with a motor shaft for driving a tool. The machine tool is coupled to the manipulator, by which it can also be positioned. For coupling the motor shaft of the machine tool to the tool, the system comprises a shaft coupling that can be constructed in accordance with any of the embodiments described here.

A further embodiment refers to a system with a shaft coupling that can be constructed in accordance with any of the embodiments described here and with at least one changing station. The changing station has a support plate with a recess. The recess defines a placement position in which the first coupling part of the shaft coupling can be inserted into the recess. The conical shaft segment of the first coupling part projects here from the support plate. The system may further comprise a stop arranged on the support plate. One end of the securing element may protrude sidewise from the second coupling part and the stop may be arranged relative to the placement position such that the stop can push the protruding end of the securing element into the second coupling part, thereby releasing the latching connection. The system may have a proximity sensor that is arranged to be able to detect a movement of the securing element during the coupling of the two coupling parts. The support plate may be spring-mounted on a base (see, e.g. FIG. 10, spring 515), enabling the support plate to be lifted up respective of the base (safety feature).

A further embodiment refers to a method in accordance to which, first, a second coupling part of a shaft coupling is aligned coaxially to a first coupling part of the shaft coupling lying ready in a changing station (see, e.g. FIG. 11) by means of a manipulator (see, e.g. FIG. 3). After this the second coupling part is pressed onto the first coupling part until the securing element of the second coupling part snaps into place at a shaft shoulder of the first coupling part and forms a latching connection (see, e.g. FIGS. 6, 7 and 9). After snapping into place, by lifting up the second coupling part, the first coupling part (together with the tool) can also be lifted out of the changing station. Using the tool attached to the first coupling part and with the aid of the manipulator, a (machining) process can be automatedly carried out on a workpiece. Following this, the shaft coupling is inserted into the changing station (or into a different changing station) such that the securing element of the second coupling part can be actuated via a stop in the respective changing station, thereby releasing the latching connection. After disengaging, the second coupling part is removed from the respective changing station by means of the manipulator while the first coupling part remains in the changing station.

By pressing the second coupling part against the first coupling part, a conical shaft segment of the first coupling part can be inserted into a conical hub of the second coupling part, thereby forming a conical seat. The shaft shoulder of the first coupling part can be pushed, counter to the action of an elastic force, far enough into the second coupling part for the securing element to snap into place on the shaft shoulder so that the elastic force biases the conical seat when snapped in place. Upon snapping into place, the securing element is moved transversely to an axis of rotation of the shaft coupling and this movement can be detected by means of a proximity sensor. When the latching connection is released, the shaft shoulder can be pushed away from the securing element by means of a spring (see, e.g. FIG. 7, spring 334, or FIG. 9, spring 334'). After placing the shaft coupling into the changing station (or into a different changing station), the shaft coupling can be rotated around its axis of rotation until the end of the securing element that protrudes from the second coupling part comes to rest against the stop of the changing station.

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof

The invention claimed is:

1. A shaft coupling, comprising:
a first coupling part comprising a shaft and a conical shaft segment, the shaft having a first end configured for attachment of a tool and a second end on which a shaft shoulder is arranged;
a second coupling part comprising a conical hub into which the conical shaft segment is configured to be inserted to form a conical seat, and a securing element configured to move transversely with respect to an axis of rotation of the shaft coupling, the securing element being configured to snap into place on the shaft shoulder of the shaft; and
at least one spring arranged to produce an elastic force which, when the securing element is snapped in place, acts on the conical seat in an axial direction and biases the conical seat.

2. The shaft coupling of claim 1, wherein an outer end of the securing element protrudes from the second coupling part.

3. The shaft coupling of claim 1, wherein the first coupling part has a hollow shaft that is axially movably mounted on the shaft, wherein the conical shaft segment is part of the hollow shaft, and wherein the at least one spring is included in the first coupling part and is arranged such that, when the conical shaft segment is inserted into the conical hub, the hollow shaft is pushed counter to the elastic force of the at least one spring on the shaft.

4. The shaft coupling of claim 3, wherein when the conical shaft segment is inserted into the conical hub, the shaft shoulder of the shaft is inserted into the second coupling part until the securing element snaps into place on the shaft shoulder and forms a latching connection.

5. The shaft coupling of claim 3, wherein the shaft has a further shaft shoulder that forms an end stop for the hollow shaft, and wherein the elastic force of the at least one spring presses the hollow shaft against the end stop.

6. The shaft coupling of claim 3, further comprising:
a feather key arranged between the shaft and the hollow shaft such that an axial movement between the shaft and the hollow shaft is possible and a rotation is blocked.

7. The shaft coupling of claim 1, wherein the second coupling part has a lower part and an upper part that is axially movable relative to the lower part and in which the conical hub is arranged, and wherein the at least one spring is arranged between the lower part and the upper part such that, when the conical shaft segment is inserted counter to the elastic force of the at least one spring and into the conical hub, the lower part is pushed towards the upper part.

8. The shaft coupling of claim 1, wherein the securing element has an opening into which the shaft is inserted until the securing element snaps into place on the shaft shoulder of the shaft, and wherein a latching connection prevents the shaft from being pulled back out of the opening.

9. The shaft coupling of claim 8, wherein when the securing element is snapped in place, the elastic force of the at least one spring biases the conical shaft segment against the conical hub.

10. The shaft coupling of claim 8, wherein each of an edge of the opening in the securing element and a peripheral edge of the shaft are beveled, and wherein the bevel on the edge of the shaft and the bevel on the edge of the opening slide on each other when the shaft is inserted, thereby moving the securing element.

11. A system, comprising:
a manipulator;
a machine tool comprising a motor shaft configured to drive a tool, the machine tool being coupled to and configured to be positioned by the manipulator; and
a shaft coupling configured to couple the motor shaft of the machine tool to the tool, the shaft coupling comprising:
a first coupling part comprising a shaft and a conical shaft segment, the shaft having a first end configured for attachment of the tool and a second end on which a shaft shoulder is arranged;
a second coupling part comprising a conical hub into which the conical shaft segment is configured to be inserted to form a conical seat, and a securing element configured to move transversely with respect to an axis of rotation of the shaft coupling, the securing element being configured to snap into place on the shaft shoulder of the shaft; and
at least one spring arranged to produce an elastic force which, when the securing element is snapped in place, acts on the conical seat in an axial direction and biases the conical seat.

12. A system, comprising:
a shaft coupling comprising:
a first coupling part comprising a shaft and a conical shaft segment, the shaft having a first end configured for attachment of a tool and a second end on which a shaft shoulder is arranged;
a second coupling part comprising a conical hub into which the conical shaft segment is configured to be inserted to form a conical seat, and a securing element configured to move transversely with respect to an axis of rotation of the shaft coupling, the securing element being configured to snap into place on the shaft shoulder of the shaft; and at least one spring arranged to produce an elastic force which, when the securing element is snapped in place, acts on the conical seat in an axial direction and biases the conical seat; and at least one changing station comprising a support plate with a recess that defines a placement position in which the first coupling part of the shaft coupling is configured to be inserted into the recess, wherein the conical shaft segment of the first coupling part protrudes from the support plate.

13. The system of claim 12, further comprising:

a stop provided on the support plate, wherein an end of the securing element protrudes sidewise out of the second coupling part and the stop is arranged relative to the placement position such that the stop is configured to push the protruding end of the securing element into the second coupling part, whereby a latching connection is released.

14. The system of claim 12, further comprising:

a proximity sensor arranged such that the proximity sensor is configured to detect a movement of the securing element during coupling of the first and the second coupling parts.

15. The system of claim 12, wherein the support plate is spring-mounted on a base such that the support plate is configured to be raised with respect to the base.

16. A method, comprising:

aligning, by a manipulator, a second coupling part of a shaft coupling, which has a conical hub, coaxially to a first coupling part of the shaft coupling that has a conical shaft segment and provided in a changing station;

pressing the second coupling part against the first coupling part until a securing element of the second coupling part snaps into place at a shaft shoulder of the first coupling part and forms a latching connection;

lifting the second coupling part such that the first coupling part is lifted out of the changing station;

carrying out an automated process with a tool mounted on the first coupling part by a manipulator;

placing the shaft coupling into the changing station or into a further changing station such that the securing element of the second coupling part in the respective changing station is actuated via a stop such that the latching connection is released; and removing the second coupling part from the respective changing station by the manipulator while the first coupling part remains in the changing station.

17. The method of claim 16, wherein by pressing the second coupling part against the first coupling part, the conical shaft segment of the first coupling part is inserted into the conical hub of the second coupling part and forms a conical seat, and wherein the shaft shoulder of the first coupling part is pushed contrary to an elastic force into the second coupling part until the securing element snaps into place on the shaft shoulder such that the elastic force in the snapped-in state biases the conical seat.

18. The method of claim 16, wherein when snapping into place, the securing element is moved transversely to an axis of rotation of the shaft coupling and the movement is detected by a proximity sensor.

19. The method of claim 16, wherein after placing the shaft coupling into the changing station or into a further changing station, the shaft coupling is rotated around an axis of rotation until an end of the securing element that protrudes from the second coupling part comes to rest against a stop.

20. The method of claim 16, wherein when the latching connection is released, the shaft shoulder is pushed away from the securing element by a spring.

* * * * *